United States Patent [19]
Swamy et al.

[11] Patent Number: 5,884,977
[45] Date of Patent: Mar. 23, 1999

[54] VEHICLE SEAL CUSHION WITH PASSIVE UNBALANCED LOAD COMPENSATION

[75] Inventors: Bala Swamy, Canton; Alicia Maria Vertiz, Rochester Hills; Uttam Mukhopadhyay, West Bloomfield, all of Mich.

[73] Assignee: General Motors Corporation, Detroit, Mich.

[21] Appl. No.: 917,523

[22] Filed: Aug. 26, 1997

[51] Int. Cl.⁶ .................................................... F16F 3/02
[52] U.S. Cl. ............................. 297/452.52; 297/284.2; 297/312; 5/215
[58] Field of Search ............................ 297/284.2, 312, 297/452.52, 452.49; 5/211, 212, 215

[56] References Cited

U.S. PATENT DOCUMENTS

| | | | |
|---|---|---|---|
| 83,001 | 10/1868 | Smith ........................................ | 5/212 |
| 3,749,442 | 7/1973 | Berg et al. ............................... | 297/312 |
| 4,606,532 | 8/1986 | Kazaoka et al. ............... | 297/452.52 X |
| 4,858,992 | 8/1989 | LaSota ................................. | 297/284.2 |
| 4,889,385 | 12/1989 | Chadwick et al. ...................... | 297/302 |
| 5,024,485 | 6/1991 | Berg et al. ............................... | 297/312 |
| 5,288,127 | 2/1994 | Berg et al. ............................... | 297/312 |

FOREIGN PATENT DOCUMENTS

| | | | |
|---|---|---|---|
| 2003661 | 8/1971 | Germany ............................ | 297/284.2 |
| 361220943 | 10/1986 | Japan ................................ | 297/452.52 |

*Primary Examiner*—Peter R. Brown
*Attorney, Agent, or Firm*—Patrick M. Griffin

[57] ABSTRACT

An improved split suspension seat cushion maintains the differing elevation response of a conventional split suspension seat to unequal loading, while evening out the differing reactive upward forces that occur between sides of a conventional split suspension. The left and right suspension mats of the embodiment disclosed, which stretch in response to loading to create an upward reactive forced, are joined to one another at the back through a short sliding cable. In response to an imbalance in a previously balanced and even loading, one side is able to sink down without significantly increasing its stretch, while the other side is able to rise up without significantly decreasing its stretch, thereby maintaining an even loading side to side.

1 Claim, 2 Drawing Sheets

// # VEHICLE SEAT CUSHION WITH PASSIVE UNBALANCED LOAD COMPENSATION

TECHNICAL FIELD

This invention relates to vehicle seat cushions in general, and specifically to such a cushion that automatically and passively evens out seat occupant loads that are initially unbalanced between left and right sides.

BACKGROUND OF THE INVENTION

Seat cushions with a so called split suspension are well known in the art. Two, individual occupant suspension members, generally split between a left and right side of the cushion frame, independently support the left and right sides of an occupant. Thereby, should a seated occupant lean more heavily from the right to the left side, the left side can sink down farther, and the right side rise up higher, independently. This also translates into a greater perceived pressure on left side, since the left suspension will either be compressed or stretched to a greater degree, creating more reactive upward force on the occupant's left side. The converse holds true for the right side, of course. Such designs are generally presented as improving seat occupant comfort, because of the independent yieldability of the two sides. However, the unbalanced loading created thereby and perceived by the seat occupant can detract from comfort. Variations of this basic, independent split seat suspension may be seen in U.S. Pat. No. 3,749,442 issued Jul. 31, 1973 to Berg et al.; U.S. Pat. No. 5,024,485 issued Jun. 18, 1991 to Berg et al.; and U.S. Pat. No. 5,288,127 issued Feb. 22, 1994 to Berg et al.

SUMMARY OF THE INVENTION

The subject invention provides a comfort enhancing variation of the basic left, right split suspension in which the unbalanced loading that would otherwise be created is compensated and redistributed to rebalance the load between the left and right sides.

Left and right support suspensions, tensioned mats in the preferred embodiment disclosed, are stretched between the front and back of a rigid seat cushion frame. The front mount of each suspension mat is rigid, while the rear mount is able to move back and forth relative to a rear seat cushion frame member. In order to passively transfer pressure from the right the left suspension mat, a load compensation cable interconnects the movable rear mounts, through a pair of hollow tubes.

In response to an initial imbalance between the right and left sides, such as that caused by a physical shift of the occupant body weight between the left and right sides, the initially more heavily loaded mat is able to sink down as its rear mount is pulled down and out, thereby substantially maintaining its original tension, rather than stretching farther as it lowers. Conversely, the initially more heavily loaded suspension is able to stretch and increase in tension as its rear mount is pulled in and up, rather than relaxing as rises. Pressure is transferred, in effect, from the more heavily loaded to the less heavily loaded suspension side, improving the perceived pressure balance. The individual elevation response of the basic split suspension is retained, while the load imbalance that would otherwise be created is removed or at least reduced.

BRIEF DESCRIPTION OF THE DRAWINGS

These and other features of the invention will appear from the following written description, and from the drawings, in which.

DESCRIPTION OF THE PREFERRED EMBODIMENT

Figure 1:
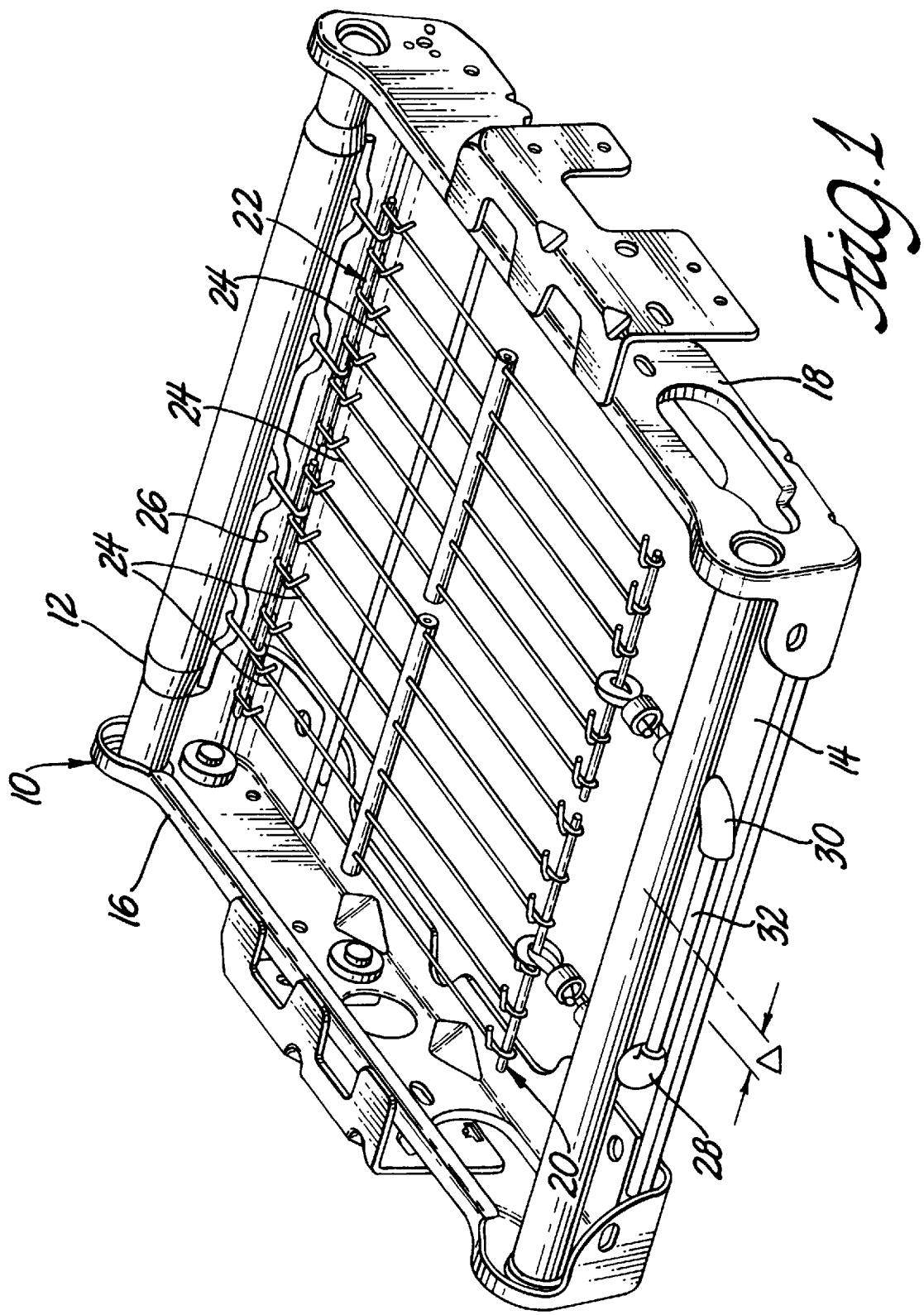
FIG. 1 is a perspective view of a seat cushion frame incorporating a preferred embodiment of the invention.

Referring first to FIG. 1, a rigid, generally rectangular seat cushion frame, indicated generally at 10, includes generally parallel front 12 and rear 14 frame members, joined by generally parallel left 16 and right 18 side members. Left and right suspensions in the form of hammock like suspension mats, indicated at 20 and 22 respectively, occupy and divide the left and right interior areas of frame 10, extending parallel to the side members 16 and 18. Each suspension mat 20 and 22 consists of identical individual resilient wires 24 which, while they are capable of stretching individually, are ganged together to effectively respond as a single resilient unit that can be stretched or relaxed into greater or lesser tension. Each suspension mat 20 and 22 is oriented beneath a respective left and right side of a seated occupant, and react to the downward load of the occupant by stretching until they create an equal, upward reactive pressure or load that resists the downward seat load. In practice, the mats 20 and 22 would be covered by a compressible foam cushion covering all of frame 10, through which the pressure of the tensioned mats would be transferred to the seated occupant, but this is shown removed for ease of illustration. The front mount for each mat 20 and 22 is simply a fixed bar and hook assembly 26, which does not stretch or move appreciably in response to stretching of the mats 20 and 22. The rear mounts, on the other hand, can move in response to stretching and loading of the mats 20 and 22. The rear mounts consist of a pair of generally L shaped hollow tubes 28 and 30 inserted rigidly through the rear suspension member 14, and through which a short, flexible but non stretchable cable 32 can slide. Cable 32 is fixed at each end to the rear of a respective left and right mat 20 and 22. As a consequence, the rear of either mat 20 or 22 can move out and down, reflected in a matching in and up motion of the rear of the opposite mat 22 or 20, or vice versa, as the cable 32 slides through the tubes 28 and 30. The forces that can cause this differential motion, and its effect on the occupant, are described below.

Figure 2:
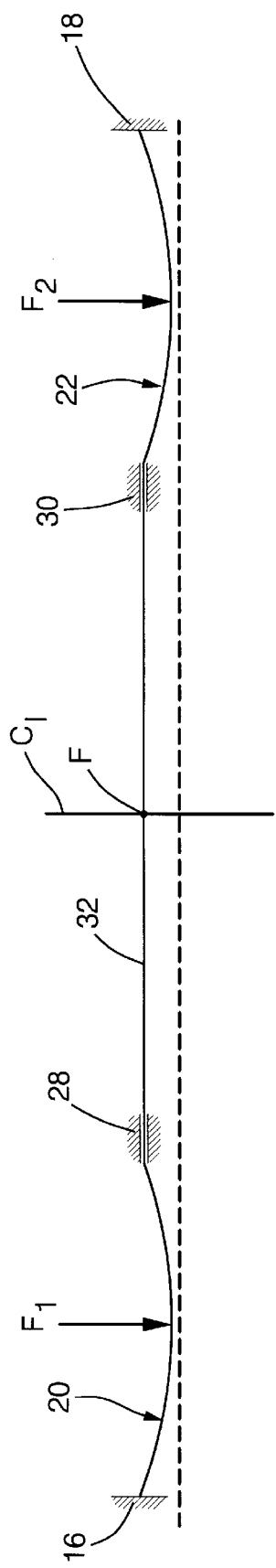
FIG. 2 is a schematic view illustrating the response of a split suspension seat without load compensation to a balanced occupant seat load.

Referring next to FIG. 2, the response of a split suspension seat without load compensation to various loadings helps to distinguish and illustrate the differing response of the invention. A prior art type of response can be created simply by fixing the cable 32 at the point F so that is unable to slide through the tubes 28 and 30. The point F is also located at a central line C1 which is a convenient reference frame for motion. So fixing the rear mounts of each suspension mat 20 and 22 renders the cable 32 incapable of transferring load or pressure from one side to the other. Thus, the response to loading is substantially identical to that of a conventional split type seat with independently acting sides, be they tensioned mats or independent pivoting plates supported by compression springs. That is, each side responds independently, with no effect on the other. In FIG.

2, the response with a substantially equal side to side loading, with F1 substantially equal to F2 is illustrated. This would occur from an occupant sitting squarely on the seat, not leaning to either side, and not rounding a curve, or otherwise causing one side to press more heavily downward than the other. Each mat 20 and 22 is stretched downwardly an equal amount until the tension therein creates an equal pressure and upward reactive force equivalent to the downward force of the occupant. A dotted horizontal line indicates the lowest point to which each mat 20 and 22 is stretched, and also serves as a convenient reference frame.

Figure 3:
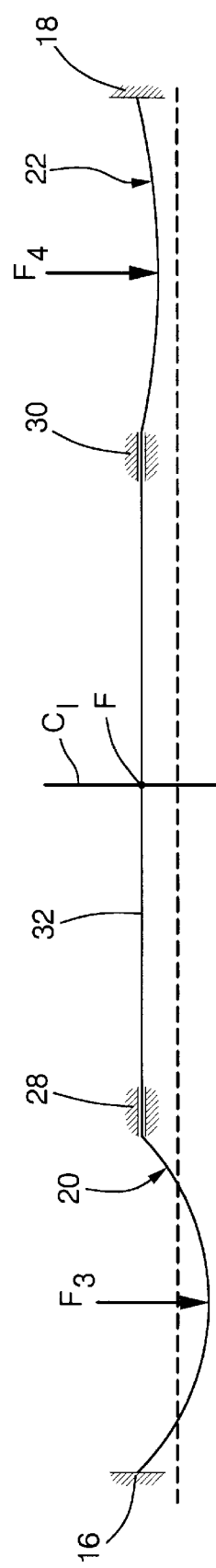
FIG. 3 is a schematic view illustrating the response of the seat of FIG. 2 to an unbalanced occupant seat load.

Referring next to FIG. 3, the response of the seat of FIG. 2 to unbalanced loading is illustrated. If the seat occupant should lean heavily to the left or sharply round a curve to the right, then the left suspension mat 20 can be more heavily downwardly loaded and the right suspension mat 22 correspondingly less lightly loaded. The unbalanced downward forces are represented as F3, which is greater that F1 and F2, and F4, which is less than F1 and F2. As a consequence of the asymmetric downward loading, the left mat 20 is stretched downwardly farther than it was in FIG. 2, as can be seen by comparison to the dotted horizontal line, and creates a greater upward force in response, equal to F3. Conversely, the right mat 22 rises up higher, is stretched less, and creates a lesser upward reactive force, equal to F4. Thus, there is both an elevation and a pressure or force differential that occurs from unbalanced loading when the two sides 20 and 22 are independently acting. Again, the same response would occur if the two sides of the seat were independently pivoted plates supported by compression springs, such as those disclosed in the patents referred to above.

Figure 4:
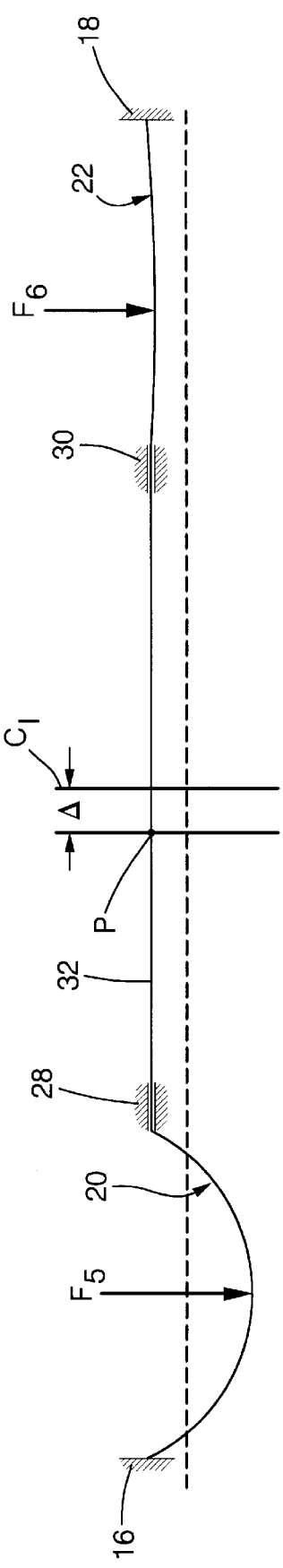
FIG. 4 is a schematic view illustrating the differing response of the self compensating split suspension seat of the invention to a load that is initially unbalanced similarly to the unbalanced load of FIG. 3.

Referring finally to FIG. 4, the differing response of the invention to a load that is as initially unbalanced as that shown in FIG. 3 is illustrated. That is, an initial uneven load of F3 and F4 is applied. Now, however, the center point of cable 32, indicated at P, is not fixed. Therefore, cable 32 can slide freely side to side through the hollow supports 28 and 30, specifically, sliding to the left by an amount indicated at Δ. Now, in response to the initially greater load F3 on the left suspension mat 20, it does not just stretch downwardly to a greater depth to create a consequently greater upward reactive force and pressure, as in FIG. 2. Instead, left mat 20 can sink downwardly, as opposed to stretch downwardly, since its rear mount is no longer fixed, but can slide down and out. This distinction between downward sinking and downward stretching is an important one, as it allows the left suspension mat 20 to maintain substantially the same stretch or tension as it sinks and lowers in elevation. And, again, the upward force or pressure perceived by the occupant is a function of stretch and tension in the mat 20, as opposed to its elevation, in this case. Lower elevation inevitably translates into a tighter stretch only if the rear mount is fixed. By thus maintaining an end to end stretch that is substantially equal to its initial stretch, the left mat 20 is ultimately able to create an upward reactive force equal to F5 that is less than F3, and more nearly equal to F1, its initial value. On the opposite side, and simultaneously, the right suspension mat 22 is able to rise up from its initial elevation of FIG. 3, but without decreasing its stretch. Since its rear mount slides up and in with the cable 32 as it slides to the left, right suspension mat 22 is also able to maintain close to its initial stretch as it rises. Thus, the upward reactive force equal to F6 that it ultimately attains is greater than F4 and closer to F2. Again, F1 and F2 are substantially equal. So, a change in elevation of the lowest points of the hammock like suspensions 20 and 22 is divorced from an inevitable concurrent change in stretch, tension and upward reactive force therein. Instead, the elevation disparity is increased somewhat, as compared to FIG. 2, but the upward reactive force differential is reduced, and almost evened out to an equal loading. This improves the perceived comfort level of the seat occupant, as opposed to a conventional split suspension seat without side to side load compensation.

Variations in the disclosed embodiment could be made. Instead of a stretchable, hammock like seat suspension, separate, compressible and inflatable air bladders could be used on the left and right sides, occupying the same general areas of the seat cushion frame 10 and the left and right mats 20 and 22. However, the bladders would not be independently acting. Instead, a passively acting pressure transfer means in the form of a tube would interconnect them, serving the same purpose as the sliding cable 32. Now, greater downward pressure on the left bladder would not simply compress it downwardly a bit, and increase its pressure, but would instead allow it to passively deflate a bit, maintaining its original pressure, despite the increased loading on its side, while sending air to the right side to inflate it and maintain its original pressure, despite the decreased loading on its side. Cable 32 could, if desired, incorporate a coil tension spring at its center, so long as enough undisturbed cable 32 remained to slide freely through the tubes 28 and 30. Such a center cable spring would effectively add some resilience to the mats 20 and 30, but the sliding action of cable 32 and the force balancing effect would remain. In any case, the self balancing, compensating response to uneven loading is totally passive and automatic, and improves the perceived comfort level of the seat occupant while maintaining the independent level attainment available from a confessional split suspension seat cushion.

We claim:

1. A split suspension automotive seat cushion with unbalanced seat occupant load compensation, comprising;

a rigid, generally rectangular cushion frame having substantially parallel front and back members and substantially parallel left and right side members, a pair of left and right, resilient, tensioned suspension mats stretched between a fixed mount on said front frame member and a slidable rear mount on said rear frame member, each mat being located so as to provide tensioned support to a respective left and right side of a seated seat cushion occupant, and, a sliding load compensation cable joining the rear slidable mounts of said right and left suspension mats to one another, whereby, a seat occupant loading that is initially balanced but becomes unbalanced between left and right sides can cause the more heavily loaded suspension mat to sink down while substantially maintaining the initial stretch of the more heavily loaded mat and simultaneously pull on the load compensation cable to raise the more lightly loaded suspension mat while substantially maintaining its initial stretch, thereby more evenly balancing the loads between the right and left sides.

* * * * *